(12) United States Patent
Oka et al.

(10) Patent No.: US 9,122,259 B2
(45) Date of Patent: Sep. 1, 2015

(54) MULTI-AXIS MOTOR DRIVING SYSTEM AND MOTOR DRIVING APPARATUS

(71) Applicant: Kabushiki Kaisha Yaskawa Denki, Kitakyushu-shi (JP)

(72) Inventors: Yusuke Oka, Kitakyushu (JP); Tadashi Okubo, Kitakyushu (JP); Akira Takeuchi, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 12 days.

(21) Appl. No.: 14/140,562

(22) Filed: Dec. 26, 2013

(65) Prior Publication Data
US 2014/0184129 A1    Jul. 3, 2014

(30) Foreign Application Priority Data
Dec. 27, 2012 (JP) .................................. 2012-285553

(51) Int. Cl.
G05B 15/02 (2006.01)
H02P 5/74 (2006.01)
H02P 3/14 (2006.01)

(52) U.S. Cl.
CPC ...... *G05B 15/02* (2013.01); *H02P 3/14* (2013.01); *H02P 5/74* (2013.01)

(58) Field of Classification Search
CPC ........................................... H02P 5/74
USPC ............................................ 318/600, 560, 34
See application file for complete search history.

(56) References Cited

U.S. PATENT DOCUMENTS 5,150,020 A * 9/1992 Ueda et al. ...................... 318/87
7,408,319 B2 * 8/2008 Lloyd et al. .................... 318/729
7,511,438 B2 * 3/2009 Melfi ............................... 318/87

FOREIGN PATENT DOCUMENTS

JP 3547594 B2 7/2004
JP 2005-253213 A 9/2005
JP 2010-110139 A 5/2010

OTHER PUBLICATIONS

The office action for Japanese patent application No. 2012-285553 dated on Mar. 18, 2014 and the partial translation thereof.

* cited by examiner

*Primary Examiner* — David S Luo
(74) *Attorney, Agent, or Firm* — Hubbs, Enatsky & Inoue PLLC

(57) ABSTRACT

A multi-axis motor driving system, including a plurality of motor driving apparatuses respectively connected to motors and each provided with a regenerative power consumption unit for consuming regenerative power generated from the corresponding motor. The plurality of motor driving apparatuses are connected to a common DC bus. The plurality of motor driving apparatuses each include a regenerative controller for controlling start and stop of activation of the regenerative power consumption unit based on a voltage of the common DC bus.

19 Claims, 8 Drawing Sheets

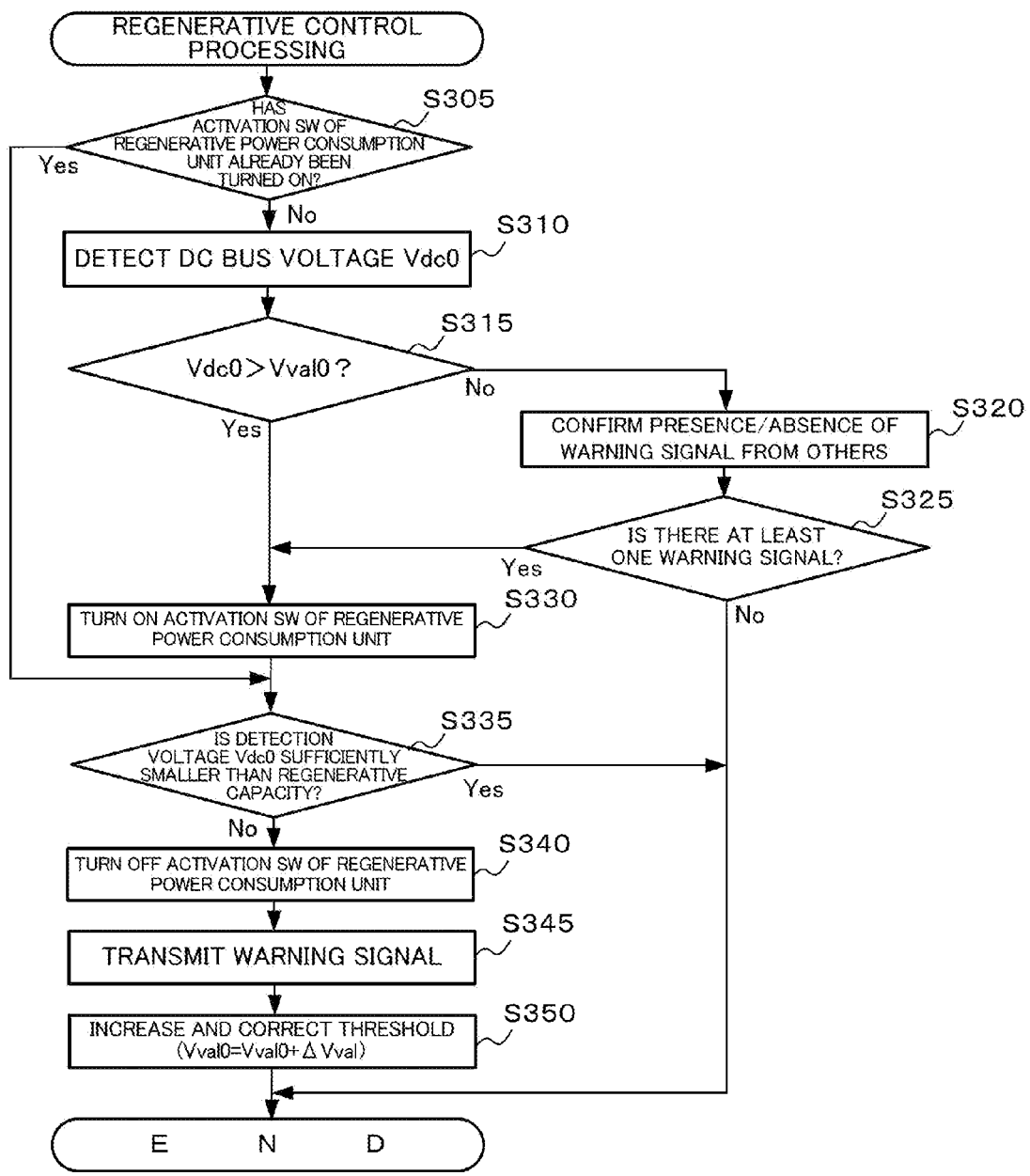

MULTI-AXIS MOTOR DRIVING SYSTEM AND MOTOR DRIVING APPARATUS

INCORPORATION BY REFERENCE

The present disclosure contains subject matter related to that disclosed in Japanese Priority Patent Application JP2012-285553 filed in the Japan Patent Office on Dec. 27, 2012, the entire contents of which are hereby incorporated by reference.

BACKGROUND OF THE INVENTION

1. Field of the Invention

The embodiment disclosed herein relates to a multi-axis motor driving system and a motor driving apparatus.

2. Description of the Related Art

Japanese Patent No. 3547594 discloses a configuration in which a system controller or a master motor control device is provided for a plurality of motor control devices that share a PN voltage of the common DC power source so as to avoid concentration of regenerative power on a regenerative resistor of any of the motor control devices. According to the technology disclosed in Japanese Patent No. 3547594, the system controller or the master motor control device is configured to adjust regenerative operation voltage levels of the motor control devices so that respective regenerative circuits may operate evenly to minimize a gap of a regenerative load consumption amount among the motor control devices.

SUMMARY OF THE INVENTION

A multi-axis motor driving system according to one embodiment includes a first driver and a second driver, the first and second drivers are respectively connected to a first motor and a second motor, the first and second drivers being connected to a common DC bus, the first and second drivers each including: a regenerative power consumption unit for consuming regenerative power generated from a corresponding motor; and a regenerative controller for controlling start and stop of activation of the regenerative power consumption unit based on a voltage of the common DC bus.

A motor driving apparatus according to one embodiment includes: an output line to be connected to a motor; an input line to be connected to a common DC bus shared by a second motor driving apparatus; a regenerative power consumption unit for consuming regenerative power generated from the motor; and a regenerative controller for controlling start and stop of activation of the regenerative power consumption unit based on the voltage of the common DC bus, the regenerative controller being configured to start the activation of the regenerative power consumption unit at substantially the same time as activation of a regenerative power consumption unit included in the second motor driving apparatus.

BRIEF DESCRIPTION OF THE DRAWINGS

In the accompanying drawings:

FIG. 8 is an exemplary flowchart illustrating the contents of control executed by the CPU of the motor driving apparatus in order to realize regenerative control processing according to the second modified example.

DESCRIPTION OF THE EMBODIMENTS

One embodiment is now described with reference to the accompanying drawings.

Figure 1:
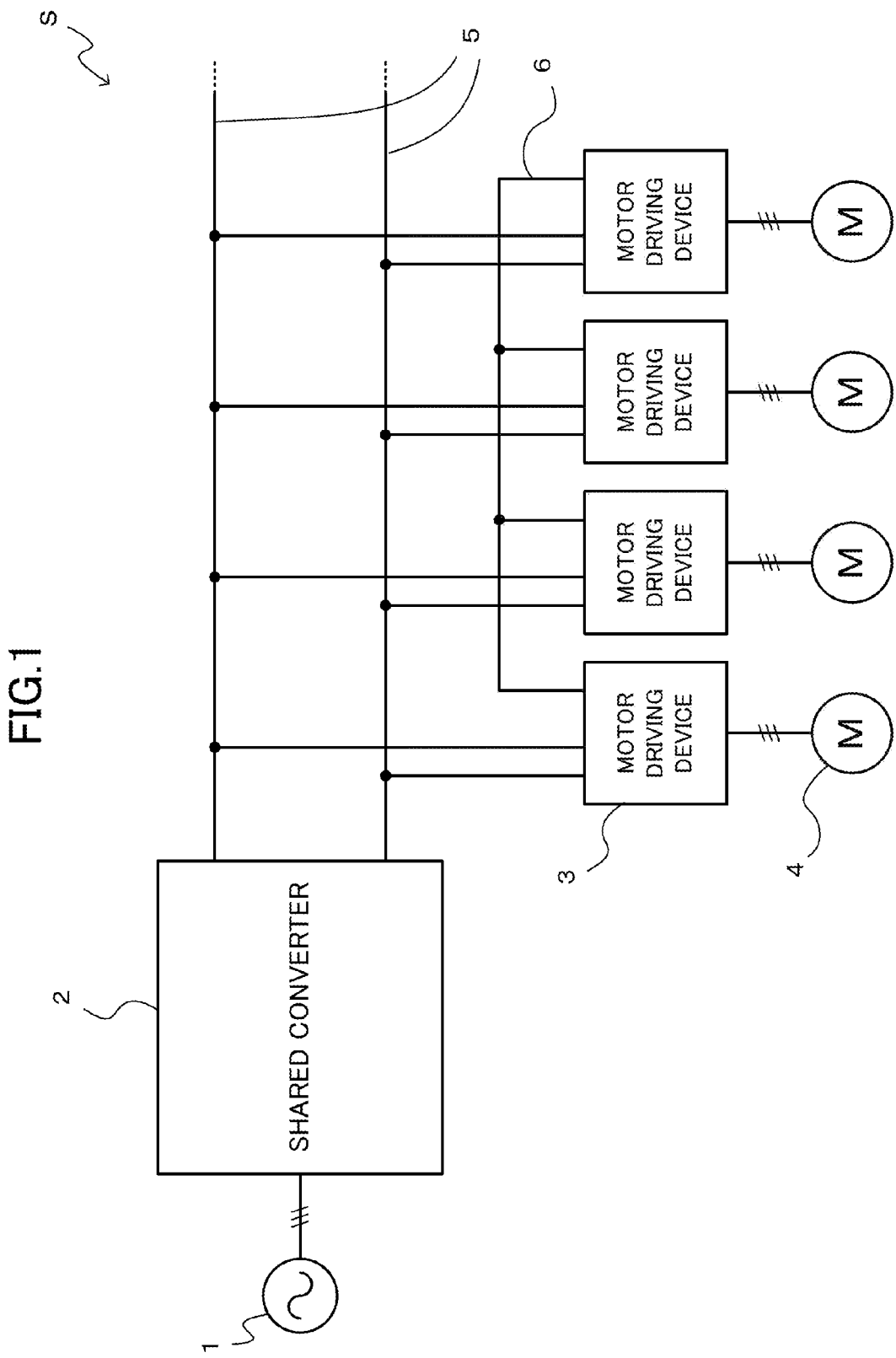
FIG. 1 is a diagram schematically illustrating an overall system configuration of a multi-axis motor driving system according to one embodiment.

First, referring to FIG. 1, a description is given of a schematic configuration of a multi-axis motor driving system according to this embodiment. As illustrated in FIG. 1, a multi-axis motor driving system S includes one converter 2 connected to a three-phase AC power source 1, a plurality of motor driving apparatuses 3, and motors 4 respectively connected to the motor driving apparatuses 3. The converter rectifies and smoothes AC power supplied from the three-phase AC power source 1 to convert the AC power into DC power, and outputs the DC power to a DC bus 5 including a pair of two lines, i.e., a P line on the positive side and an N line on the negative side. The plurality of motor driving apparatuses 3 are connected to the common DC bus 5 to be supplied with the DC power, and respectively control the drive of the motors 4 connected thereto, based on a control command input from an unillustrated host control device.

In the illustrated example, each motor 4 is a rotary three-phase AC motor, and each motor driving apparatus 3 converts the DC power supplied from the converter 2 through the DC bus 5 into three-phase AC power whose amplitude and frequency are arbitrarily modulated, and controls the torque, the rotation speed, and the rotation position of each motor 4 connected thereto. Then, the motors 4 are driven by the host control device in an integrated manner, thereby controlling the drive of a multi-axis machine as exemplified by so-called factory automation (not drawn) as a whole. The motor 4 includes a position detector such as an unillustrated encoder for detecting its own rotation position. In the following, the multi-axis motor driving system S is described by way of a four-axis configuration including four pairs of the motor driving apparatuses 3 and the motors 4, and the motor driving apparatuses 3 are configured to mutually transmit and receive information via a network 6. Note that, the motor driving apparatus 3 corresponds to the above-mentioned driver.

Figure 2:
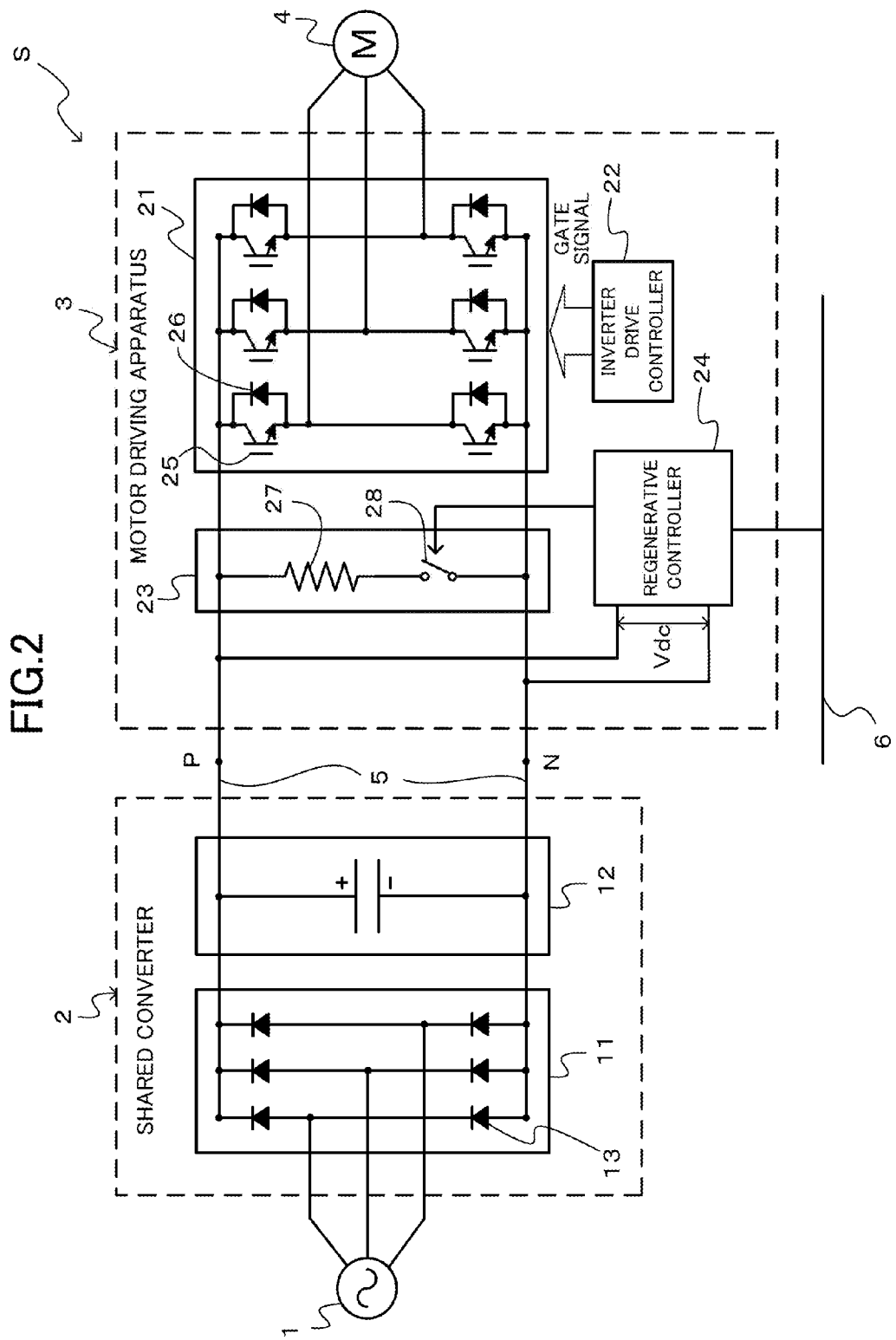
FIG. 2 is a diagram schematically illustrating a circuit configuration of a combination of a converter and one motor driving apparatus.

Next, FIG. 2 illustrates a circuit configuration of a combination of the converter 2 and one motor driving apparatus 3. Any of the motor driving apparatuses 3 has basically the same circuit configuration, although varying in capacity, parameter, and the like.

The converter 2 includes a rectifier 11 and a smoothing capacitor 12. The rectifier 11 is a diode bridge including six diodes 13. The rectifier 11 performs full-wave rectification on AC power supplied from the three-phase AC power source 1 and outputs the resultant DC power to the DC bus 5. The smoothing capacitor 12 is connected across the DC bus 5 to smooth the DC power obtained by the full-wave rectification of the rectifier 11.

The motor driving apparatus 3 includes an inverter unit 21, an inverter drive controller 22, a regenerative power consumption unit 23, and a regenerative controller 24.

The inverter unit 21 is a device in which six arm switching elements 25 made of semiconductor such as IGBTs and six diodes 26 are bridge-connected. Specifically, two circuits in each of which the arm switching element 25 and the diode 26 as a flywheel diode (FWD) are connected in parallel are connected in series as a pair, and three pairs of the series circuits are connected in parallel to the smoothing capacitor 12. Upon receiving a gate signal from the inverter drive controller 22, each arm switching element 25 performs switching so that the DC power on the smoothing capacitor 12 side may be output from an intermediate connection position of each pair correspondingly to the respective phases of the three-phase AC motor 4. For example, when the motor 4 suddenly decelerates or suddenly stops, the motor 4 functions as a generator to generate regenerative power that is back-fed to the DC bus 5 from the motor 4. In other words, when the motor 4 operates as a generator, rotational (kinetic) energy is converted into regenerative power (regenerative energy), and the regenerative power flows from the motor 4 into the DC circuit in the converter 2 through the DC bus 5 via the diodes 26 of the inverter unit 21. This operation of generating the regenerative power in the inverter unit 21 is hereinafter referred to as "regenerative operation".

The inverter drive controller 22 is configured by software executed by an unillustrated CPU. The inverter drive controller 22 controls the inverter unit 21 by outputting a gate signal based on PWM control to each of the arm switching elements 25 of the inverter unit 21 so that desired power may be supplied to the motor 4 based on a motor control command from the host control device (not shown).

The regenerative power consumption unit 23 is, for example, a series circuit of a regenerative resistor 27 and an activation switch 28. The regenerative power consumption unit 23 is connected across the DC bus 5 in the motor driving apparatus 3. When the activation switch 28 is connected (turned ON), the regenerative power that is back-fed to the DC bus 5 by the above-mentioned regenerative operation is allowed to flow through the regenerative resistor 27 to be consumed. Note that, the activation switch 28 may be composed of a mechanical switch such as a relay or an electrical switch such as a high breakdown voltage transistor.

The regenerative controller 24 is configured by software executed by the unillustrated CPU. The regenerative controller 24 appropriately controls the start and stop of activation of the regenerative power consumption unit 23 (turns ON and OFF the activation switch 28) so that the smoothing capacitor 12 may not be overcharged or the DC bus voltage may not be boosted excessively due to an increase in the back-fed regenerative power.

As illustrated in FIG. 1, because the plurality of motor driving apparatuses 3 are connected in parallel to the common DC bus 5, the respective regenerative power consumption units 23 are also connected in parallel to each other, and the activation thereof is individually controlled by the corresponding regenerative controller 24. The regenerative controllers 24 of the motor driving apparatuses 3 each detect a DC voltage Vdc of the DC bus 5, and also mutually transmit and receive other information related to the regenerative control via the network 6.

Basically, each regenerative controller 24 starts the activation of the regenerative power consumption unit 23 at the time at which the DC voltage Vdc detected from the DC bus 5 exceeds a predetermined threshold (before the smoothing capacitor 12 is overcharged) in order to suppress the damage to the smoothing capacitor 12 due to an overcharge. However, an error (fluctuation) is inevitably included in the voltage value Vdc detected from the common DC bus 5 among the plurality of motor driving apparatuses 3 because of hardware precision limitations such as a difference in balance at the component level. Accordingly, even when the above-mentioned predetermined threshold is set to the same value among the motor driving apparatuses 3 in a software manner, it is often the case that the regenerative power consumption units 23 of the plurality of motor driving apparatuses 3 do not always start to activate simultaneously.

In this case, the regenerative power is consumed in a concentrated manner by one (or a small number of) regenerative power consumption unit 23 that has started to activate first. Then, the charge of the smoothing capacitor 12 in the converter 2 is stopped, and the increase in the voltage Vdc of the DC bus 5 stops. Thus, in the other motor driving apparatuses 3, the detected DC bus voltage Vdc does not exceed the threshold and the regenerative power consumption unit 23 does not start to activate. As a result, a regenerative load (regenerative power) is concentrated only on the regenerative power consumption unit 23 that has already started to activate. If the regenerative power generated from a large number of the motor driving apparatuses 3 is supplied to one (or a small number of) regenerative power consumption unit 23 in a concentrated manner as described above, the regenerative resistor 27 of this regenerative power consumption unit 23 may become a regenerative overload condition and is damaged.

In the multi-axis motor driving system S according to this embodiment, on the other hand, the regenerative controller 24 of each motor driving apparatus 3 controls the start and stop of activation based on the voltage Vdc of the common DC bus 5 so that an excessive regenerative load may not be concentrated on each regenerative power consumption unit 23. As a specific method for suppressing the concentration of the regenerative load, all the regenerative power consumption units 23 are started to activate at substantially the same time through mutual monitoring among the motor driving apparatuses 3 via the network 6, and the regenerative power is dispersed to the regenerative controllers 24 of the motor driving apparatuses 3 and consumed.

Figure 3:
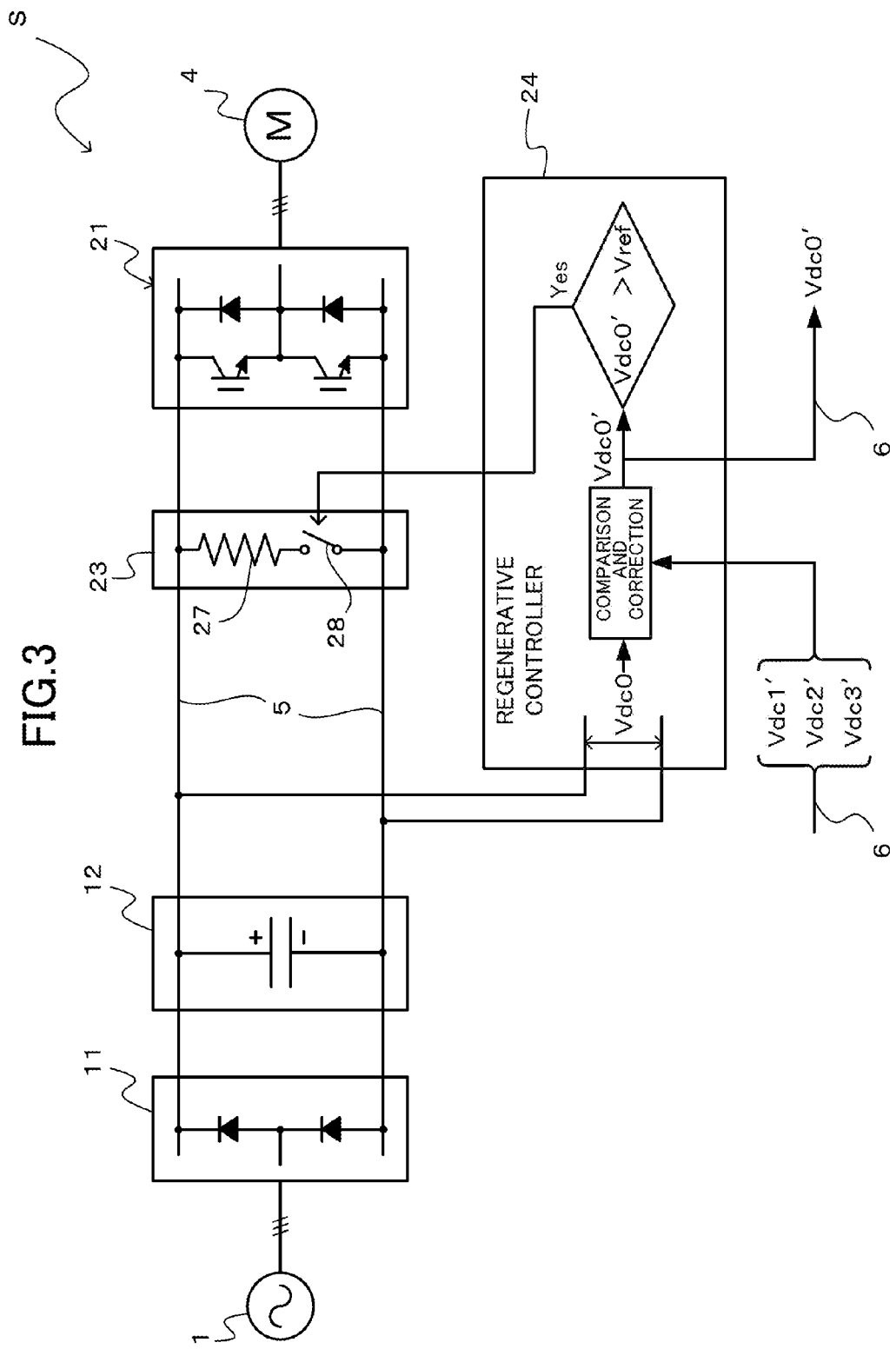
FIG. 3 is a diagram illustrating a simplified circuit configuration of the multi-axis motor driving system and software blocks showing the contents of control of a regenerative controller according to the embodiment.

Referring to FIG. 3 illustrating a simplified circuit configuration of the multi-axis motor driving system S, a description is now given of the contents of control of the regenerative controller 24 according to an example of this embodiment. The inside of the regenerative controller 24 is illustrated by software blocks corresponding to the control procedures. In the example of this embodiment, the regenerative controllers 24 detect the same DC bus voltage Vdc0, and mutually transmit and receive detection voltages Vdc0, Vdc1, Vdc2, and Vdc3 via the network 6 to monitor each other. Then, the regenerative controller 24 corrects its own detection voltage Vdc0 itself (or adjusts a detection gain to correct the detection voltage Vdc0) based on a comparison of the detection voltages Vdc0 to Vdc3, thereby being capable of minimizing an error of detection voltages Vdc0' to Vdc3' among the regenerative controllers 24. Note that, it is the corrected detection voltages Vdc0' to Vdc3' that are transmitted and received via the network 6. In this manner, based on a comparison between the detection voltage Vdc0' having a small detection error among the regenerative controllers 24 and a threshold Vref set in common among the regenerative controllers 24, the regenerative power consumption units 23 of the motor driving apparatuses 3 can be started to activate at substantially the same time. Note that, the above-mentioned threshold Vref corresponds to a predetermined threshold.

Figure 4:
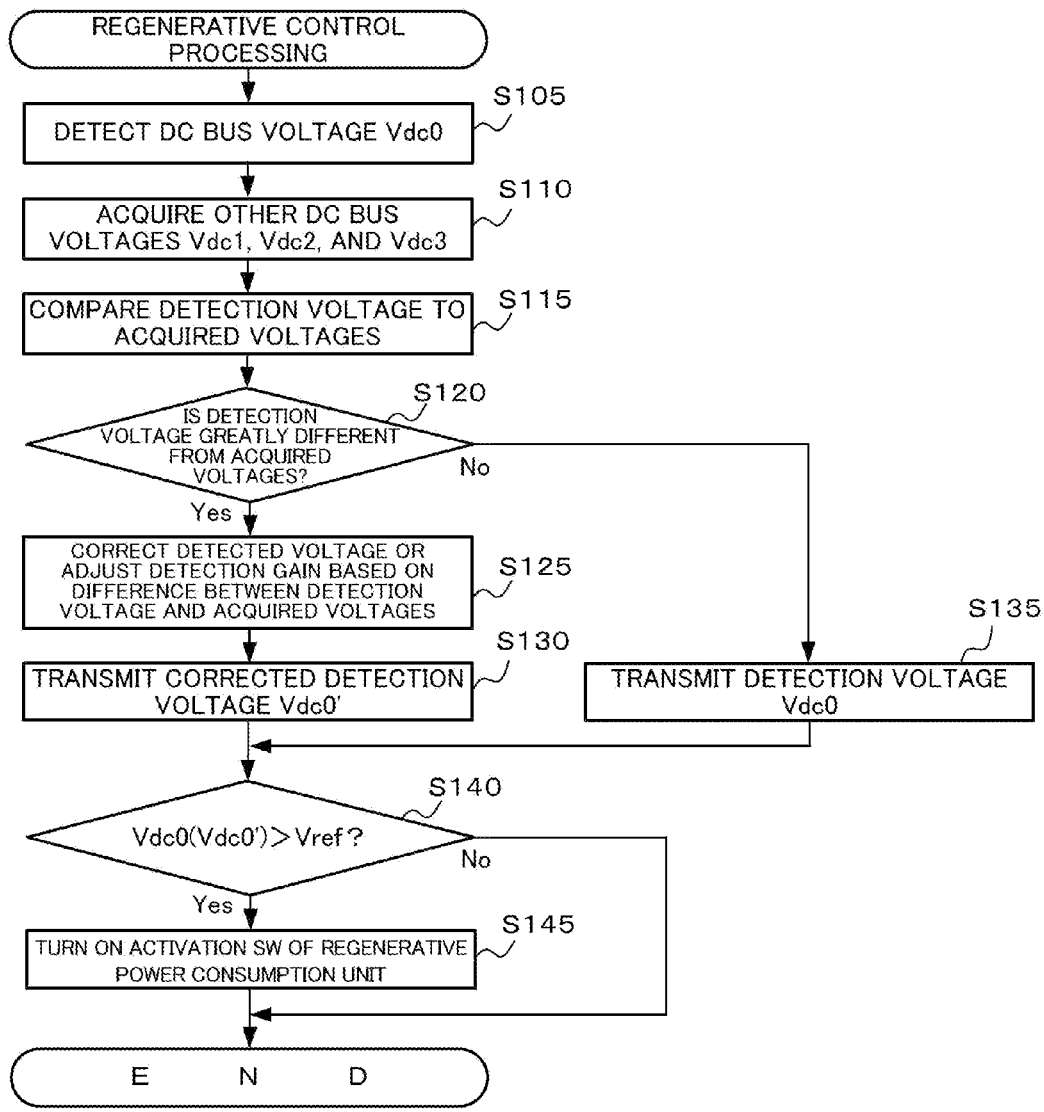
FIG. 4 is an exemplary flowchart illustrating the contents of control executed by a CPU of the motor driving apparatus in order to realize regenerative control processing according to the embodiment.

Referring to FIG. 4, the contents of regenerative control processing executed in the regenerative controller 24 by the CPU in order to realize the above-mentioned functions are now described in sequence.

Processing illustrated in the flow of FIG. 4 is invoked at a predetermined cycle and repeatedly executed. Note that, when each motor driving apparatus 3 is powered on, the activation switch 28 of any of the regenerative power consumption units 23 needs to be turned OFF.

First, in Step S105, the regenerative controller 24 detects the DC bus voltage Vdc0. In a hardware manner, a voltage of a DC power supply line connected to the DC bus in the motor driving apparatus 3 is detected.

Next, the flow proceeds to Step S110. The regenerative controller 24 acquires DC bus voltages Vdc1', Vdc2', and Vdc3' via the network 6, which are detected (and corrected) and transmitted by the regenerative controller 24 of other motor driving apparatuses 3.

Next, the flow proceeds to Step S115. The regenerative controller 24 compares its own DC bus voltage Vdc0 detected in Step S105 (hereinafter referred to as "detection voltage") to the other DC bus voltages Vdc1' to Vdc3' acquired in Step S110 (hereinafter referred to as "acquired voltages").

Next, the flow proceeds to Step S120. The regenerative controller 24 determines whether or not the detection voltage Vdc0 is greatly different from the other acquired voltages Vdc1' to Vdc3'. In other words, the regenerative controller 24 determines whether or not the motor driving apparatus 3 to which it belongs has solely detected a greatly different voltage value for the same DC bus voltage. When the detection voltage Vdc0 is greatly different, the determination criterion is satisfied, and the flow proceeds to Step S125.

In Step S125, based on the difference between the detection voltage Vdc0 and the acquired voltages Vdc1' to Vdc3', the regenerative controller 24 corrects the detection voltage Vdc0 itself or appropriately adjusts the detection gain of the regenerative controller 24 for the DC bus voltage.

Next, the flow proceeds to Step S130. The regenerative controller 24 transmits a corrected detection voltage Vdc0' to the other motor driving apparatuses 3 via the network 6. Then, the flow proceeds to next Step S140.

On the other hand, when it is determined in Step S120 that the detection voltage Vdc0 is not greatly different from the other acquired voltages Vdc1' to Vdc3', the determination criterion is not satisfied, and the flow proceeds to Step S135.

In Step S135, the regenerative controller 24 transmits the detection voltage Vdc0 as it is to the other motor driving apparatuses 3 via the network 6. Then, the flow proceeds to next Step S140.

In Step S140, the regenerative controller 24 determines whether or not the detection voltage Vdc0 or the corrected detection voltage Vdc0' is higher than a predetermined threshold Vref. The threshold Vref is set to be, for example, slightly lower than a voltage value at which the smoothing capacitor 12 of the converter 2 is overcharged. When the detection voltage Vdc0 (Vdc0') is equal to or lower than the threshold Vref, the determination criterion is not satisfied, and the flow is finished without any further processing.

On the other hand, when the detection voltage Vdc0 (Vdc0') exceeds the threshold Vref, the determination criterion is satisfied, and the flow proceeds to Step S145.

In Step S145, the regenerative controller 24 turns ON the activation switch 28 of the regenerative power consumption unit 23 of this motor driving apparatus 3. Then, this flow is finished.

In the above, the procedure of Step S105 functions as a voltage detector, the procedure of Step S140 and Step S145 functions as a first normal starter, and the procedure of Step S125 functions as a detection corrector.

As described above, according to the multi-axis motor driving system S and the motor driving apparatus 3 in this embodiment, each motor driving apparatus 3 includes the regenerative controller 24 for controlling the start and stop of activation of the regenerative power consumption unit 23 based on the voltage Vdc of the DC bus 5 so that an excessive regenerative load may not be concentrated on each regenerative power consumption unit 23. Consequently, the damage to each regenerative power consumption unit 23 due to a regenerative overload can be suppressed with the use of a simple configuration without additionally providing a host device or a master servo (special driving device) for centrally managing the activation of each regenerative power consumption unit 23.

According to this embodiment, the regenerative controllers 24 included in the respective motor driving apparatuses 3 start the activation of all the regenerative power consumption units 23 at substantially the same time. In this manner, the regenerative load is not concentrated on one or a small number of regenerative power consumption units 23, and the regenerative power can be dispersed to all the regenerative power consumption units 23 and consumed. Consequently, the damage to the regenerative power consumption unit 23 due to a regenerative overload can be suppressed.

According to this embodiment, the regenerative controllers 24 of the motor driving apparatuses 3 individually detect the same DC bus voltage Vdc0 by the procedure of Step S105, and start to activate the corresponding regenerative power consumption unit 23 of the motor driving apparatus 3 based on the comparison between the detection voltage Vdc0 and the predetermined threshold Vref set in common among the motor driving apparatuses 3 by the procedure of Step S140 and Step S145. On the other hand, the regenerative controllers 24 of the motor driving apparatuses 3 mutually monitor the detection voltages Vdc0 to Vdc3 to correct their own detection voltage Vdc0 (or adjust the detection gain or the like) by the procedure of Step S125, thereby being capable of minimizing an error of the detection voltages Vdc0 to Vdc3 among the motor driving apparatuses 3. In this manner, all the regenerative power consumption units 23 can be activated at substantially the same time so that the regenerative power may be dispersed to the regenerative power consumption units and consumed. Consequently, the damage to each regenerative power consumption unit 23 due to a regenerative overload can be suppressed.

Note that, in the above-mentioned configuration, the regenerative controllers 24 of the motor driving apparatuses 3 mutually monitor the corrected detection voltages Vdc0' to Vdc3', and correct their own detection voltage Vdc0 based on the comparison of the corrected detection voltages Vdc0' to Vdc3', thereby minimizing an error of the detection voltages Vdc0 to Vdc3 with respect to the voltage Vdc of the common DC bus 5 among the regenerative controllers 24. Then, based on the comparison to the threshold Vref that is set to the same value by each regenerative controller 24 in a software manner, the regenerative power consumption units 23 of the motor driving apparatuses 3 are started to activate at substantially the same time.

This embodiment, however, is not limited thereto. Instead of correcting the respective detection voltages Vdc0, the regenerative controllers 24 may properly correct the respective thresholds Vref so that the regenerative power consumption units 23 of the motor driving apparatuses 3 may be started to activate at substantially the same time. In this case, for example, the regenerative controllers 24 mutually transmit and receive the detection voltages Vdc0 to Vdc3 without any correction via the network 6. Because the detection voltages Vdc0 to Vdc3 are obtained from the same DC bus voltage Vdc, each of the regenerative controllers 24 only needs to appropriately correct an individually set threshold Vref0 so that the regenerative power consumption units 23 may be started to activate at substantially the same time, based on the comparison of the detection voltages Vdc0 to Vdc3 on the assumption that the detection voltages Vdc0 to Vdc3 are obtained from the same DC bus voltage Vdc. Alternatively, the regenerative controllers 24 may also mutually transmit and receive the respective individually set thresholds Vref0 to Vref3, and may correct the thresholds Vref0 to Vref3 based on the relationships between the detection voltages Vdc0 to Vdc3 and the thresholds Vref0 to Vref3.

In the above-mentioned configuration, the plurality of motor driving apparatuses 3 share the single converter 2 as their power supply units, but this embodiment is not limited thereto. In this embodiment, the plurality of motor driving apparatuses 3 only need to be connected with each other via the common DC bus, and each motor driving apparatus 3 may independently include a power supply unit such as a converter or may additionally be connected to an external power source such as a battery, for example.

Note that, this embodiment is not limited to the above-mentioned configuration, and various modifications are possible within the range not departing from the gist and technical concept thereof. The modified examples are hereinafter described in sequence.

(1) Estimating the Start of Activation of the Regenerative Power Consumption Units in the Other Motor Driving Apparatuses In the above-mentioned configuration, the regenerative controllers 24 of the plurality of motor driving apparatuses 3 are configured to mutually monitor the voltage values Vdc0' to Vdc3' detected from the common DC bus 5 and correct their own detection voltage Vdc0 so as to minimize an error among the voltage values Vdc0' to Vdc3'. In this manner, all the regenerative power consumption units 23 are started to activate at substantially the same time. This embodiment, however, is not limited thereto. For example, each motor driving apparatus 3 may be configured to determine the start of activation of the regenerative power consumption units 23 in the other motor driving apparatuses 3 and start the activation of its own regenerative power consumption unit 23 when determining that at least one of the regenerative power consumption units has started to activate.

Figure 5:
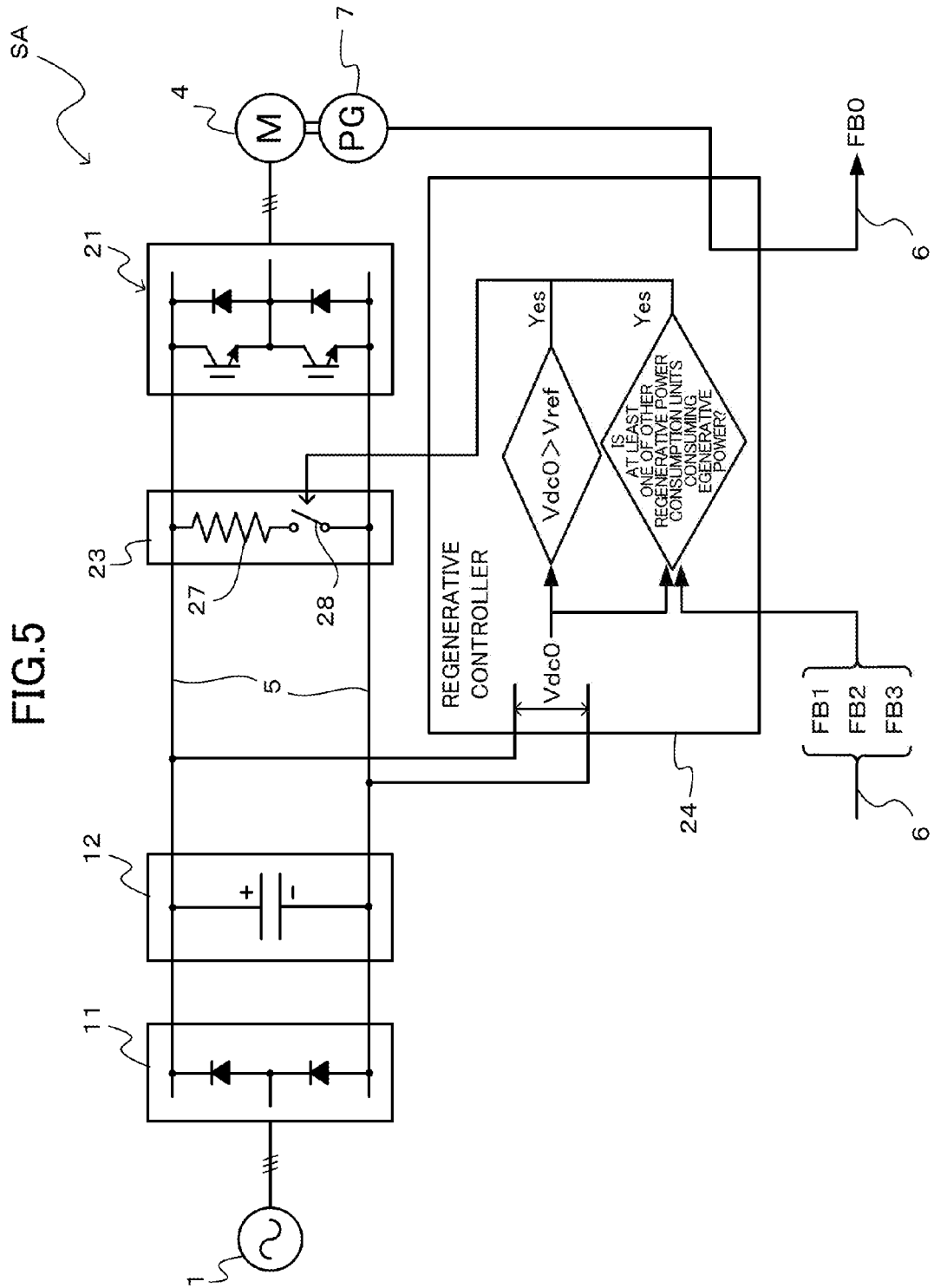
FIG. 5 is a diagram illustrating a simplified circuit configuration of a multi-axis motor driving system and software blocks showing the contents of control of a regenerative controller according to a first modified example.

Referring to FIG. 5 corresponding to FIG. 3, a description is given of the contents of control of a regenerative controller 24A according to this modified example. In this modified example, each regenerative controller 24A performs two start determinations in parallel. In the first start determination, the regenerative controller 24A simply compares the detection voltage Vdc0 obtained from the DC bus 5 and the common threshold Vref to each other, and starts the activation of the regenerative power consumption unit 23 when the detection voltage Vdc0 exceeds the threshold Vref.

In the second start determination, the regenerative controller 24A determines the start of activation of the regenerative power consumption units 23 included in the other motor driving apparatuses 3A based on motor speeds FB1, FB2, and FB3 of the other motor driving apparatuses 3A acquired via the network 6 and the above-mentioned detection voltage Vdc0. When the regenerative controller 24A determines the start of activation of at least one of the regenerative power consumption units 23, the regenerative controller 24A also starts the activation of its own regenerative power consumption unit 23. To realize this configuration, a multi-axis motor driving system SA according to this modified example includes a speed detector 7 for detecting a speed FB0 of a motor connected to the motor driving apparatus 3A, and transmits the detected speed FB0 as it is to the other motor driving apparatuses 3A via the network 6. Instead of the detected speed FB0, a motor speed obtained within the motor driving apparatus 3A through differential operation of rotation position detection signals of the position detector included in the motor 4 may be used. Alternatively, a speed command generated inside each motor driving apparatus 3A or a speed command supplied from the unillustrated host device may be used.

When the regenerative controller 24A determines based on a temporal change of the detected speed FB1 of any of the other motor driving apparatuses 3A that the motor 4 connected to this motor driving apparatus 3A is decelerating or is suddenly stopped, it is determined that the motor 4 at this time is in a regenerative operation state in which the motor 4 generates regenerative power. Further, when the detection voltage Vdc0 is lower than a normal voltage (for example, a minimum voltage that can be maintained at the DC bus 5 while all the motor driving apparatuses 3A are being activated without the regenerative operation), it is determined that the regenerative power consumption unit 23 of the above-mentioned motor driving apparatus 3A has started to activate at this time to decrease the voltage of the DC bus 5. In this manner, in the second start determination in each motor driving apparatus 3A, when the regenerative controller 24A determines that the activation of the regenerative power consumption unit 23 in at least one of the other motor driving apparatuses 3A has started, the regenerative controller 24A also starts the activation of the regenerative power consumption unit 23 of the motor driving apparatus 3A to which it belongs.

In this manner, the regenerative controller 24A of each motor driving apparatus 3A performs the first and second start determinations in parallel, and hence all the regenerative power consumption units 23 can start to activate at substantially the same time.

Figure 6:
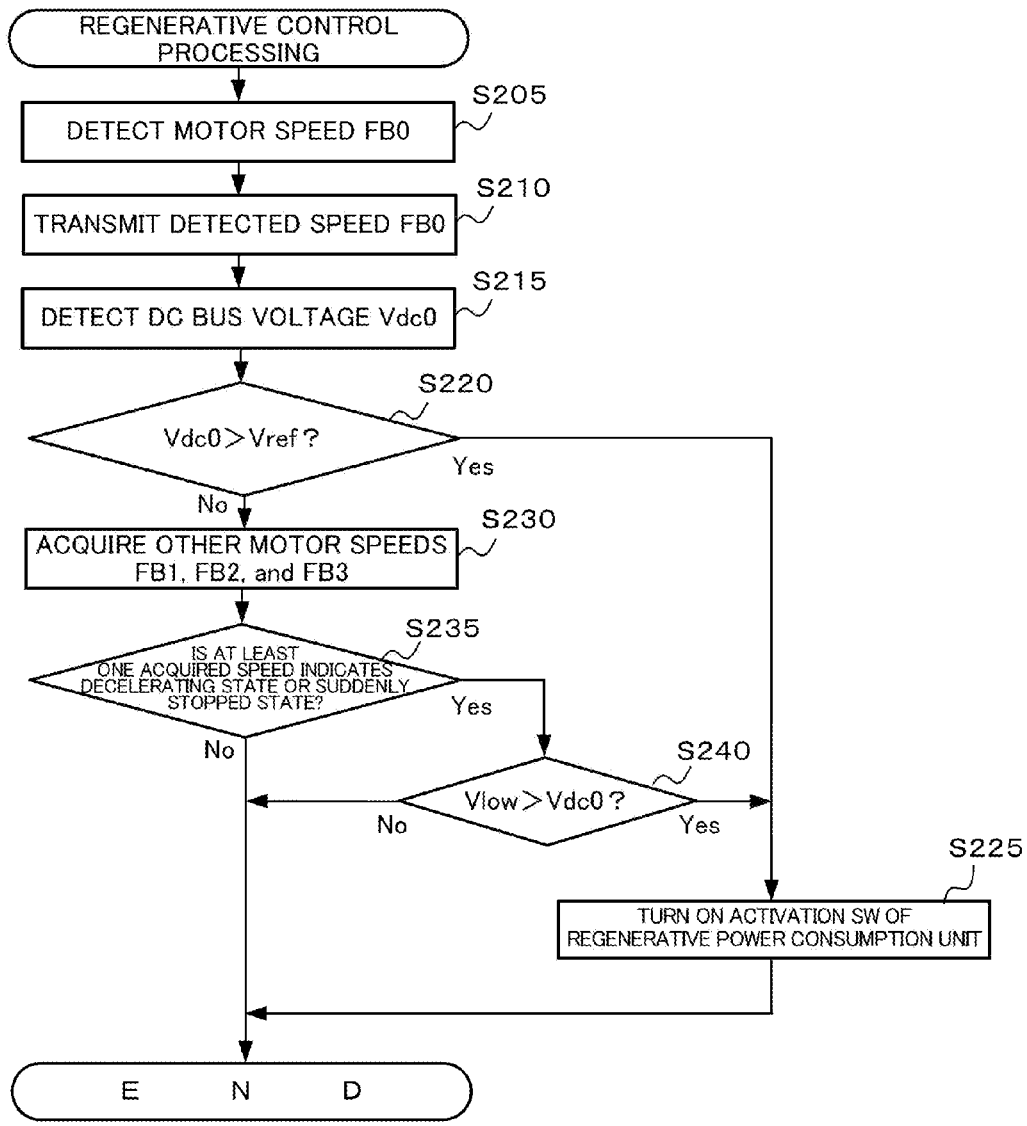
FIG. 6 is an exemplary flowchart illustrating the contents of control executed by the CPU of the motor driving apparatus in order to realize regenerative control processing according to the first modified example.

Referring to FIG. 6, the contents of regenerative control processing executed in the regenerative controller 24A by the CPU in order to realize the above-mentioned functions are now described in sequence.

Similarly to the case of the flow of FIG. 4, processing illustrated in the flow of FIG. 6 is also invoked at a predetermined cycle and repeatedly executed. When each motor driving apparatus 3A is powered on, the activation switch 28 of any of the regenerative power consumption units 23 needs to be turned OFF.

First, in Step S205, the regenerative controller 24A detects the motor speed FB0. In a hardware manner, the motor speed FB0 is detected from the speed detector 7 such as a tachogenerator provided in the motor 4 connected to the motor driving apparatus 3A.

Next, the flow proceeds to Step S210. The regenerative controller 24A transmits the motor speed FB0 detected in Step S205 to the other motor driving apparatuses 3A via the network 6.

Next, the flow proceeds to Step S215. The regenerative controller 24A detects the DC bus voltage Vdc0 (similarly to Step S105 in the above-mentioned configuration).

Next, the flow proceeds to Step S220. The regenerative controller 24A determines whether or not the detection voltage Vdc0 detected in Step S215 is higher than a predetermined threshold Vref (the threshold Vref is equivalent to that in Step S140 in the above-mentioned configuration). When the detection voltage Vdc0 is larger than the threshold Vref, the determination criterion is satisfied, and the flow proceeds to Step S225.

In Step S225, the regenerative controller 24A turns ON the activation switch 28 of the regenerative power consumption unit 23 of this motor driving apparatus 3A. Then, this flow is finished.

On the other hand, when it is determined in Step S220 that the detection voltage Vdc0 is equal to or smaller than the threshold Vref, the determination criterion is not satisfied, and the flow proceeds to Step S230.

In Step S230, the regenerative controller 24A acquires the motor speeds FB1, FB2, and FB3, which are detected and transmitted by the regenerative controllers 24A of the other motor driving apparatuses 3A via the network 6.

Next, the flow proceeds to Step S235. Based on temporal changes of the other motor speeds FB1 to FB3 acquired in Step S230, the regenerative controller 24A determines whether or not at least one of the motors 4 is decelerating or is suddenly stopped. In other words, the regenerative controller 24A determines whether or not at least one of the plurality of motor driving apparatuses 3A is in the regenerative operation state. When it is determined that none of the motor speeds FB1 to FB3 indicates the decelerating state or the suddenly stopped state, the determination criterion is not satisfied, and this flow is finished without any further processing.

When at least one of the motor speeds FB1 to FB3 indicates the decelerating state or the suddenly stopped state, on the other hand, the determination criterion is satisfied, and the flow proceeds to Step S240.

In Step S240, the regenerative controller 24A determines whether or not the DC bus voltage Vdc0 detected in Step S215 is lower than a predetermined threshold Vlow. The threshold Vlow is set to be, for example, a DC bus voltage value low enough so that it is not obtained unless any of the regenerative power consumption units 23 starts to activate to consume regenerative power. When the detection voltage Vdc0 is equal to or higher than the threshold Vlow, the determination criterion is not satisfied, and the flow is finished without any further processing. In this case, it is determined that regenerative power is charging the smoothing capacitor 12.

When the detection voltage Vdc0 is lower than the threshold Vlow, on the other hand, the determination criterion is satisfied, and the flow proceeds to Step S225. In this case, it is determined that the regenerative power consumption unit 23 of any of the other motor driving apparatuses 3A has started to activate. Then, the regenerative controller 24A turns ON the activation switch 28 of the regenerative power consumption unit 23 of this motor driving apparatus 3A, and this flow is finished.

In the above, the procedure of Step S215 functions as a voltage detector, the procedure of Step S220 and Step S225 functions as a first normal starter, the procedure of Step S205 functions as a speed detector, and the procedure of Step S235, Step S240, and Step S225 functions as a first determination starter.

As described above, also in the multi-axis motor driving system SA and the motor driving apparatus 3A according to this modified example, all the regenerative power consumption units 23 can be started to activate at substantially the same time, similarly to the above-mentioned configuration. Consequently, the regenerative power can be distributed to all the regenerative power consumption units 23 and be consumed, and hence the damage to each regenerative power consumption unit 23 due to a regenerative overload can be suppressed.

(2) Starting Activation of the Regenerative Power Consumption Units in Descending Order of Regenerative Capacities In the firstly-mentioned configuration and the first modified example, all the regenerative power consumption units 23 are started to activate at substantially the same time, to thereby suppress the damage to each regenerative power consumption unit 23 due to a regenerative overload. This embodiment, however, is not limited thereto. For example, the regenerative power consumption units 23 may be started to activate in descending order of their regenerative capacities. Note that, the magnitude of the resistance value of the regenerative resistor 27 is hereinafter taken as a specific example of the regenerative capacity, but instead, an ability to consume a certain regenerative power may be used as the regenerative capacity.

When the regenerative capacity of the regenerative power consumption unit 23 is sufficiently large, even if the magnitude of a regenerative load becomes closer to the rated value of its regenerative capacity, the regenerative resistor 27 is not damaged unless the smoothing capacitor 12 of the converter 2 is gradually re-charged to increase the DC bus voltage Vdc to a certain degree. In other words, the regenerative power consumption unit 23 having a larger regenerative capacity has a higher durability against an abrupt change of the regenerative load.

In general, as the drive capacity of the motor driving apparatus 3B itself becomes larger (the capacity of the driven motor 4 becomes larger), the regenerative power consumption unit 23 having a larger regenerative capacity is used correspondingly in the motor driving apparatus 3B. In the case where the motor driving apparatuses 3B having different drive capacities and the regenerative power consumption units 23 having different regenerative capacities are mixed in the multi-axis motor driving system SB, if the regenerative power consumption unit 23 having a small regenerative capacity starts to activate first, the regenerative load concentrated on this regenerative power consumption unit 23 immediately exceeds its regenerative capacity to damage the regenerative power consumption unit 23.

Figure 7:
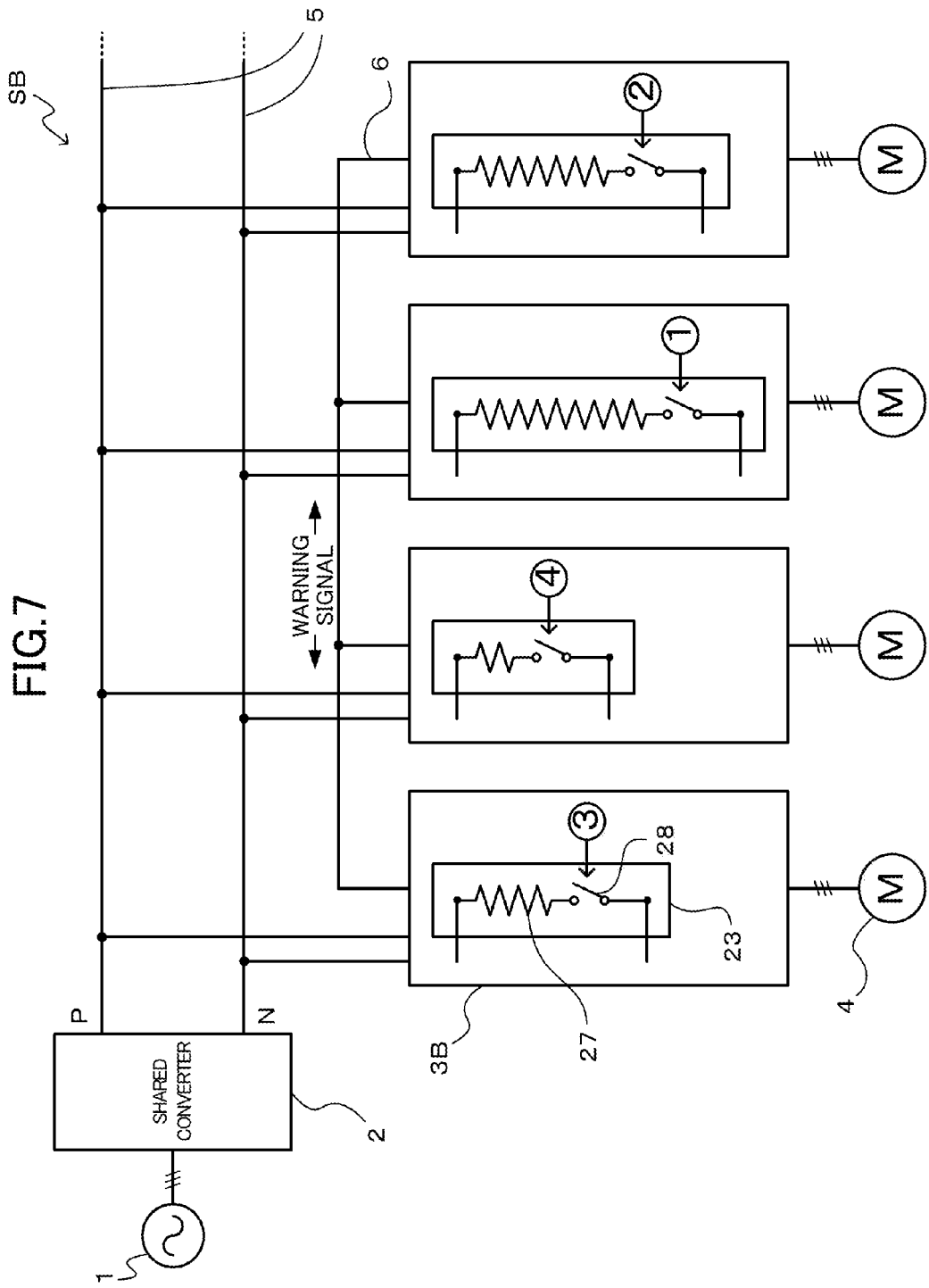
FIG. 7 is a diagram illustrating a method of starting activation of regenerative power consumption units in descending order of resistance values of regenerative resistors according to a second modified example.

In contrast, as illustrated in FIG. 7, by optimizing respective activation start times so that the regenerative power consumption units 23 may be started to activate in descending order of regenerative capacities (in descending order of resistance values of the regenerative resistors 27), the regenerative capacities of the regenerative power consumption units 23 to be activated can be appropriately increased as a whole in accordance with the increase in regenerative load. Also with this method, the damage to a specific regenerative power consumption unit 23 due to a regenerative overload can be suppressed.

Referring to FIG. 7, a description is given of the contents of control of the regenerative controller 24B according to this modified example. Illustration of the regenerative controller 24B itself is omitted due to space limitations. In this modified example, the regenerative controllers 24B individually detect the same DC bus voltage, and each start the activation of the regenerative power consumption unit 23 of the motor driving apparatus 3B based on a comparison between the detection voltage Vdc0 and an individually set threshold Vval0. As used herein, the individually set threshold Vval0 is a threshold that is stored individually by each regenerative controller 24B in a changeable manner, and is basically set to the same value by default at the time of factory shipment. On the other hand, if the regenerative load of the regenerative power consumption unit 23 of the motor driving apparatus 3B comes up close to the regenerative capacity of the regenerative power consumption unit 23 during the activation of the regenerative power consumption unit 23, the regenerative controller 24B outputs a warning signal via the network 6, and the motor driving apparatuses 3B mutually monitor the warning signal.

In the case where the regenerative power consumption unit 23 having a small regenerative capacity starts to activate first, the concentrated regenerative load immediately comes up close to its regenerative capacity, and the regenerative controller 24B of this motor driving apparatus 3B outputs a warning signal. The regenerative controller 24B of each motor driving apparatus 3B starts the activation of its own regenerative power consumption unit 23 when detecting that at least one of the other motor driving apparatuses 3B has output a warning signal. In this manner, all the regenerative power consumption units 23 can be started to activate. Then, the motor driving apparatus 3B that has output a warning signal stops the activation of the regenerative power consumption unit 23, and adds a predetermined correction value $\Delta$Vval ($>$0) to the individually set threshold Vval0 to correct the threshold Vval0. In other words, the activation start time can be delayed more for the regenerative power consumption unit 23 having a smaller regenerative capacity. By repeating such overall regenerative power consumption operation, the respective activation start times can be optimized so that the regenerative power consumption units 23 may be started to activate in descending order of their regenerative capacities.

For example, in the case where the regenerative power consumption unit 23 having a small regenerative capacity starts to activate first, the concentrated regenerative load immediately exceeds its regenerative capacity to damage the regenerative power consumption unit 23 as described above. In the case where the regenerative power consumption unit 23 having a large regenerative capacity starts to activate first, on the other hand, it takes a relatively long time for the regenerative load to become closer to its regenerative capacity. Further, even if the regenerative load becomes closer to the regenerative capacity, as described above, the DC bus voltage Vdc can be increased again to a certain degree in the meantime, and the next regenerative power consumption unit 23 can be started to activate. In this manner, by starting the activation of the regenerative power consumption units 23 in descending order of their regenerative capacities, the regenerative capacities of the regenerative power consumption units 23 to be activated can be appropriately increased as a whole in accordance with the increase in regenerative load. Consequently, the damage to the regenerative power consumption unit 23 due to a regenerative overload can be suppressed.

Referring to FIG. 8, the contents of regenerative control processing executed in the regenerative controller 24B by the CPU in order to realize the above-mentioned functions are now described in sequence.

Similarly to the case of the flows of FIG. 4 and FIG. 6, processing illustrated in the flow of FIG. 8 is also invoked at a predetermined cycle and repeatedly executed. As described above, the individually set thresholds Vval0 of all the regenerative controllers 24B need to be set to the same value by default at the time of factory shipment of the motor driving apparatuses 3B.

First, in Step S305, the regenerative controller 24B determines whether or not the activation switch 28 of the regenerative power consumption unit 23 has already been in the ON state. When the activation switch 28 is in the ON state at this time, the determination criterion is satisfied, and the flow proceeds to Step S335.

When the activation switch 28 is in the OFF state at this time, on the other hand, the determination criterion is not satisfied, and the flow proceeds to Step S310.

In Step S310, the regenerative controller 24B detects the DC bus voltage Vdc0 (similarly to Step S105 and Step S215 in the firstly-mentioned configuration and the first modified example, respectively).

Next, the flow proceeds to Step S315. The regenerative controller 24B determines whether or not the detection voltage Vdc0 detected in Step S310 is higher than an individually set threshold Vval0. When the detection voltage Vdc0 is equal to or lower than the individually set threshold Vval0, the determination criterion is not satisfied, and the flow proceeds to Step S320.

In Step S320, the regenerative controller 24B confirms whether or not a warning signal is transmitted from another motor driving apparatus 3B via the network 6.

Next, the flow proceeds to Step S325. The regenerative controller 24B determines whether or not it is confirmed in Step S320 that the warning signal has been transmitted from at least one of the motor driving apparatuses 3B. When it is confirmed that no warning signal has been transmitted, the determination criterion is not satisfied, and this flow is finished without any further processing.

When it is confirmed that the warning signal has been transmitted from at least one of the motor driving apparatuses 3B, on the other hand, the determination criterion is satisfied, and the flow proceeds to Step S330.

When it is determined in Step S315 that the detection voltage Vdc0 is higher than the individually set threshold Vval0, on the other hand, the determination criterion is satisfied, and the flow proceeds to Step S330.

In Step S330, the regenerative controller 24B turns ON the activation switch 28 of the regenerative power consumption unit 23 of this motor driving apparatus 3B.

Next, the flow proceeds to Step S335. The regenerative controller 24B measures a time during which the detection voltage Vdc0 detected in Step S310 is higher than the individually set threshold Vval0, regards this state as a regenerative load, and determines whether or not the regenerative load is sufficiently smaller than the regenerative capacity of the regenerative power consumption unit 23. In other words, the regenerative controller 24B determines whether or not the regenerative load come up close to the regenerative capacity. When the detection voltage Vdc0 is sufficiently smaller than the regenerative capacity of the regenerative power consumption unit 23, the determination criterion is satisfied, and this flow is finished without any further processing.

When the detection voltage Vdc0 come up close to the regenerative capacity of the regenerative power consumption unit 23, on the other hand, the determination criterion is not satisfied, and the flow proceeds to Step S340.

In Step S340, the regenerative controller 24B turns OFF the activation switch 28 of the regenerative power consumption unit 23 of this motor driving apparatus 3B.

Next, the flow proceeds to Step S345. The regenerative controller 24B transmits a warning signal to the other motor driving apparatuses 3B via the network 6.

Next, the flow proceeds to Step S350. The regenerative controller 24B adds a predetermined correction value ΔVval (>0) to the individually set threshold Vval0, thereby correcting the threshold Vval0 so as to be larger. Then, this flow is finished.

In the above, the procedure of Step S305 functions as a voltage detector, the procedure of Step S315 and Step S330 functions as a second normal starter, the procedure of Step S345 functions as a warning output unit, the procedure of Step S340 and Step S350 functions as a post-warning processor, and the procedure of Step S320, Step S325, and Step S330 functions as a warning starter.

As described above, the multi-axis motor driving system SB and the motor driving apparatus 3B according to this modified example are capable of optimizing the respective activation start times so that the regenerative power consumption units 23 may start to activate in descending order of their regenerative capacities. In this manner, the regenerative capacities of the regenerative power consumption units 23 to be activated can be appropriately increased as a whole in accordance with the increase in regenerative load. Consequently, the damage to a specific regenerative power consumption unit 23 due to a regenerative overload can be suppressed.

Note that, in the case of this modified example, a signal that is transmitted and received among the motor driving apparatuses 3B is only the warning signal that can be composed of a simple ON/OFF signal, and hence the motor driving apparatuses 3B only need to be mutually connected with a signal line so as to detect that a warning signal has been transmitted from at least one of the other plurality of motor driving apparatuses 3B. Thus, the motor driving apparatuses 3B may be connected via a simple signal line without using such an advanced network in which numerical data having a specific form is mutually transmitted and received among nodes (for example, a network compliant with the standard such as Ethernet (trademark) or MECHATROLINK (trademark)). In this case, there is another effect of simplifying the overall configuration of the multi-axis motor driving system SB.

Note that, the firstly-mentioned configuration and respective modified examples are applicable also to a direct-drive linear motor, in addition to the rotary motor exemplified as the motor 4.

Although the converter 2 exemplified above is supplied with AC power from the three-phase AC power source 1, it may be supplied with AC power from a single-phase AC power source.

Configurations other than those already described above may be used by appropriately combining the methods described in the firstly-mentioned configuration and respective modified examples. Besides, although not exemplified in detail, the firstly-mentioned configuration and respective modified examples are embodied with various changes within the range not departing from the gist thereof.

It should be understood by those skilled in the art that various modifications, combinations, sub-combinations and alterations may occur depending on design requirements and other factors insofar as they are within the scope of the appended claims or the equivalents thereof.

What is claimed is:

1. A multi-axis motor driving system, comprising:
   a first driver,
   a second driver,
   wherein the first and second drivers are respectively connected to a first motor and a second motor, the first and second drivers being connected to a common DC bus,
   the first and second drivers each comprising:
      a regenerative power consumption unit for consuming regenerative power generated from a corresponding motor; and
      a regenerative controller for controlling start and stop of activation of the regenerative power consumption unit based on a voltage of the common DC bus,
      the regenerative controller comprising:
         a voltage detector for detecting the voltage of the common DC bus;
         a receiver for receiving information related to the regenerative control from another regenerative controller; and
         a starter for starting the activation of the regenerative power consumption unit based on the voltage of the common DC bus detected by the detect, a threshold of the voltage of the common DC bus and the information related to the regenerative control received by the receiver.

2. The multi-axis motor driving system according to claim 1, wherein the regenerative controller starts the activation of the regenerative power consumption unit at substantially the same time as activation of another regenerative power consumption unit.

3. The multi-axis motor driving system according to claim 1, wherein the starter comprises:
   a first normal starter for starting the activation of the regenerative power consumption unit when the detection voltage of the voltage detector exceeds a threshold set in common among the first and second drivers; and
   a detection corrector for correcting the detection voltage of the voltage detector based on a comparison between the detection voltage of the voltage detector and a detection voltage of a voltage detector of another regenerative controller.

4. The multi-axis motor driving system according to claim 1, wherein the starter comprises:
   a second normal starter for starting the activation of the regenerative power consumption unit when the detection voltage of the voltage detector exceeds an individually set threshold; and
   a threshold corrector for correcting the individually set threshold based on a comparison between the detection voltage of the voltage detector and a detection voltage of a voltage detector of another regenerative controller.

5. The multi-axis motor driving system according to claim 1, wherein the starter comprises:
   a first normal starter for starting the activation of the regenerative power consumption unit when the detection voltage of the voltage detector exceeds a threshold that is common among the first and second drivers;
   a speed detector for detecting a speed of the corresponding one of the first and second motors; and
   a first determination starter for starting the activation of the regenerative power consumption unit when it is determined based on the detection voltage of the voltage detector and a detected speed of a speed detector of another regenerative controller that the regenerative power consumption unit in at least one of the first and second drivers starts to activate.

6. The multi-axis motor driving system according to claim 1, wherein the starter comprises:
   a first normal starter for starting the activation of the regenerative power consumption unit when the detection voltage of the voltage detector exceeds a threshold that is common among the first and second drivers;
a speed command acquiring unit for acquiring a speed command to be executed on the corresponding one of the first and second motors; and
a second determination starter for starting the activation of the regenerative power consumption unit when it is determined based on the detection voltage of the voltage detector and a speed command acquired by a speed command acquiring unit of another regenerative controller that the regenerative power consumption unit in at least one of the first and second drivers starts to activate.

7. A multi-axis motor driving system, comprising:
a first driver,
a second driver,
wherein the first and second drivers are respectively connected to a first motor and a second motor, the first and second drivers being connected to a common DC bus,
the first and second drivers each comprising:
   a regenerative power consumption unit for consuming regenerative power generated from a corresponding motor; and
   a regenerative controller for controlling start and stop of activation of the regenerative power consumption unit based on a voltage of the common DC bus,
   wherein the regenerative controller is configured to adjust activation start time so that the regenerative power consumption units start to activate in descending order of regenerative capacities.

8. The multi-axis motor driving system according to claim 7, wherein the regenerative controller comprises:
   a voltage detector for detecting the voltage of the common DC bus;
   a second normal starter for starting the activation of the regenerative power consumption unit when the detection voltage of the voltage detector exceeds an individually set threshold;
   a warning output unit for outputting a warning signal when a regenerative load of the regenerative power consumption unit comes up close to the regenerative capacity of the regenerative power consumption unit;
   a post-warning processor for stopping the activation of the regenerative power consumption unit and adding a predetermined correction value to the individually set threshold after the warning output unit outputs the warning signal; and
   a warning starter for starting the activation of the regenerative power consumption unit when it is detected that at least one of other regenerative controllers has output the warning signal.

9. A motor driving apparatus, comprising:
an output line to be connected to a motor;
an input line to be connected to a common DC bus shared by a second motor driving apparatus;
a regenerative power consumption unit for consuming regenerative power generated from the motor; and
a regenerative controller for controlling start and stop of activation of the regenerative power consumption unit based on the voltage of the common DC bus,
the regenerative controller comprising:
   a voltage detector for detecting the voltage of the common DC bus;
   a receiver for receiving information related to the regenerative control from another regenerative controller; and
   a starter for starting the activation of the regenerative power consumption unit based on the voltage of the common DC bus detected by the detector, a threshold of the voltage of the common DC bus and the information related to the regenerative control received by the receiver.

10. The motor driving apparatus according to claim 9, wherein the starter comprises:
   a first normal starter for starting the activation of the regenerative power consumption unit when the detection voltage of the voltage detector exceeds a predetermined threshold; and
   a detection corrector for correcting the detection voltage of the voltage detector based on a comparison between the detection voltage of the voltage detector and a detection voltage of a voltage detector of a regenerative controller included in the second motor driving apparatus.

11. The motor driving apparatus according to claim 9, wherein the starter comprises:
   a second normal starter for starting the activation of the regenerative power consumption unit when the detection voltage of the voltage detector exceeds an individually set threshold; and
   a threshold corrector for correcting the individually set threshold based on a comparison between the detection voltage of the voltage detector and a detection voltage of a voltage detector of a regenerative controller included in the second motor driving apparatus.

12. A multi-axis motor driving system, comprising:
a first and second driving means respectively connected to a first and second motor, the first and second driving means being connected to a common DC bus,
the first and second driving means each comprising:
   regenerative power consumption means for consuming regenerative power generated from a corresponding motor; and
   regenerative control means for controlling start and stop of activation of the regenerative power consumption means based on a voltage of the common DC bus,
   the regenerative control means comprising:
      voltage detection means for detecting the voltage of the common DC bus;
      reception means for receiving information related to the regenerative control from another regenerative control means; and
      starting means for starting the activation of the regenerative power consumption means based on the voltage of the common DC bus detected by the detection means, a threshold of the voltage of the common DC bus and the information related to the regenerative control received by the reception means.

13. The multi-axis motor driving system according to claim 12, wherein the regenerative control means starts the activation of the regenerative power consumption means at substantially the same time as activation of another regenerative power consumption means.

14. The multi-axis motor driving system according to claim 12, wherein the starting means comprises:
   first normal starting means for starting the activation of the regenerative power consumption means when the detection voltage of the voltage detection means exceeds a threshold set in common among the first and second driving means; and
   detection correcting means for correcting the detection voltage of the voltage detection means based on a comparison between the detection voltage of the voltage detection means and a detection voltage of voltage detection means of another regenerative control means.

15. The multi-axis motor driving system according to claim 12, wherein the starting means comprises:
  second normal starting means for starting the activation of the regenerative power consumption means when the detection voltage of the voltage detection means exceeds an individually set threshold; and
  threshold correcting means for correcting the individually set threshold based on a comparison between the detection voltage of the voltage detection means and a detection voltage of voltage detection means of another regenerative control means.

16. The multi-axis motor driving system according to claim 12, wherein the starting means comprises:
  first normal starting means for starting the activation of the regenerative power consumption means when the detection voltage of the voltage detection means exceeds a threshold that is common among the first and second driving means;
  speed detection means for detecting a speed of the corresponding one of the first and second motors; and
  first determination starting means for starting the activation of the regenerative power consumption means when it is determined based on the detection voltage of the voltage detection means and a detected speed of speed detection means of another regenerative control means that the regenerative power consumption means in at least one of the first and second driving means starts to activate.

17. The multi-axis motor driving system according to claim 12, wherein the starting means comprises:
  first normal starting means for starting the activation of the regenerative power consumption means when the detection voltage of the voltage detection means exceeds a threshold that is common among the first and second driving means;
  speed command acquiring means for acquiring a speed command to be executed on the corresponding one of the first and second motors; and
  second determination starting means for starting the activation of the regenerative power consumption means when it is determined based on the detection voltage of the voltage detection means and a speed command acquired by speed command acquiring means of another regenerative control means that the regenerative power consumption means in at least one of the first and second driving means starts to activate.

18. A multi-axis motor driving system comprising;
  a first and second driving means respectively connected to a first and second motor, the first and second driving means being connected to a common DC bus,
    the first and second driving means each comprising:
      regenerative power consumption means for consuming regenerative power generated from a corresponding motor; and
      regenerative control means for controlling start and stop of activation of the regenerative power consumption means based on a voltage of the common DC bus,
    wherein the regenerative control means are configured to adjust activation start time so that the regenerative power consumption means start to activate in descending order of regenerative capacities.

19. The multi-axis motor driving system according to claim 18, wherein the regenerative control means comprises:
  voltage detection means for detecting the voltage of the common DC bus;
  second normal starting means for starting the activation of the regenerative power consumption means when the detection voltage of the voltage detection means exceeds an individually set threshold;
  warning output means for outputting a warning signal when a regenerative load of the regenerative power consumption means comes up close to the regenerative capacity of the regenerative power consumption means;
  post-warning processing means for stopping the activation of the regenerative power consumption means and adding a predetermined correction value to the individually set threshold after the warning output means outputs the warning signal; and
  warning starting means for starting the activation of the regenerative power consumption means when it is detected that at least one of other regenerative control means has output the warning signal.

* * * * *